United States Patent

Zagar et al.

Patent Number: 5,157,402
Date of Patent: Oct. 20, 1992

[54] METHOD AND APPARATUS FOR CALCULATING MOTIONAL CHARACTERISTICS

[75] Inventors: Bernhard Zagar; Reinhard Boschanig, both of Graz, Austria

[73] Assignee: AVL Gesellschaft fuer Verbrennungstraftmaschinen und Messtechnik mbH, Prof.Dr.Dr h.c. Hans List, Austria

[21] Appl. No.: 570,856

[22] Filed: Aug. 22, 1990

[30] Foreign Application Priority Data

Aug. 28, 1989 [AT] Austria ................... 2026/89

[51] Int. Cl.$^5$ ............................ G01S 13/58
[52] U.S. Cl. ................... 342/104; 342/105; 342/115
[58] Field of Search ............ 342/104, 105, 115

[56] References Cited

U.S. PATENT DOCUMENTS

| | | | |
|---|---|---|---|
| 2,691,761 | 10/1954 | Smith, Jr. | 342/105 |
| 2,735,981 | 2/1956 | Schutz et al. | 342/105 |
| 2,824,284 | 2/1958 | Johnson | 342/104 |
| 3,882,496 | 5/1975 | Lewis et al. | 342/54 |
| 3,918,061 | 11/1975 | Elgaard | 342/115 |
| 4,030,097 | 6/1977 | Gedeon | 342/115 |
| 4,238,785 | 12/1980 | Hannigan | 342/458 |
| 4,283,989 | 8/1981 | Toulios et al. | 89/6.5 |
| 4,455,613 | 6/1984 | Shoemaker | 364/487 |
| 4,622,554 | 11/1986 | Gellekink et al. | 342/67 |
| 4,837,718 | 6/1989 | Alon | 364/565 |
| 4,851,850 | 7/1989 | Milan et al. | 342/90 |
| 4,928,523 | 5/1990 | Muhrer et al. | 342/127 X |

*Primary Examiner*—John B. Sotomayor
*Attorney, Agent, or Firm*—Hill, Van Santen, Steadman & Simpson

[57] ABSTRACT

For calculating motional characteristics, particularly of a projectile moving in a barrel of weapon, a microwave directed onto the projectile by a measuring structure is superimposed with the reflected wave and a a calculation of location-dependent velocity and acceleration is carried out based on the chronological curve of the phase difference by a one-time or, respectively, two-time differentiation. In order to reduce measured errors, the operating phase difference and, therefore, the location of the projectile is first assigned to each amplitude value in a registered interferometer signal. A compensation function for the time-dependent location of the projectile is then placed through the arc-cosine-transformed individual action points and the location-dependent projectile velocity is calculated by one-time differentiation and the acceleration is calculated by a further differentiation.

6 Claims, 2 Drawing Sheets

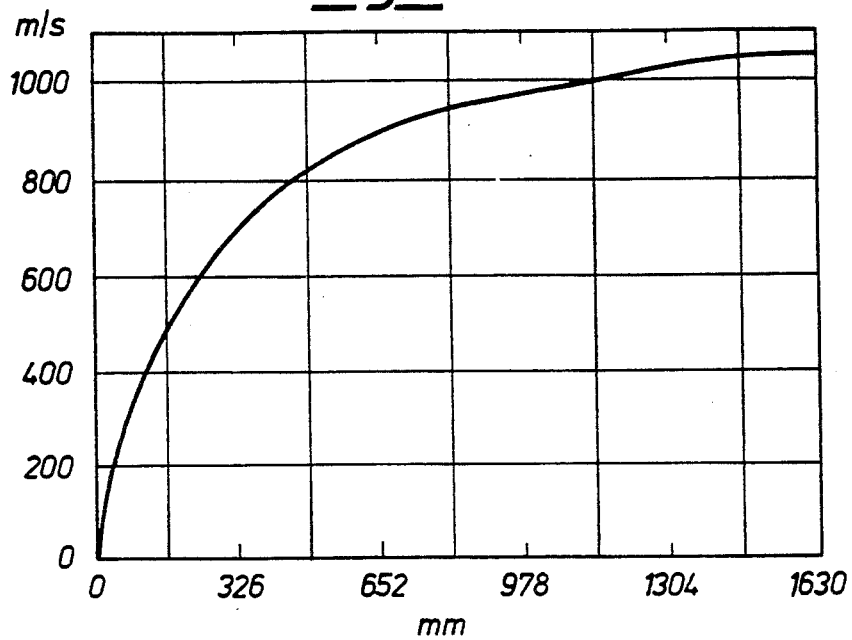
Fig. 3
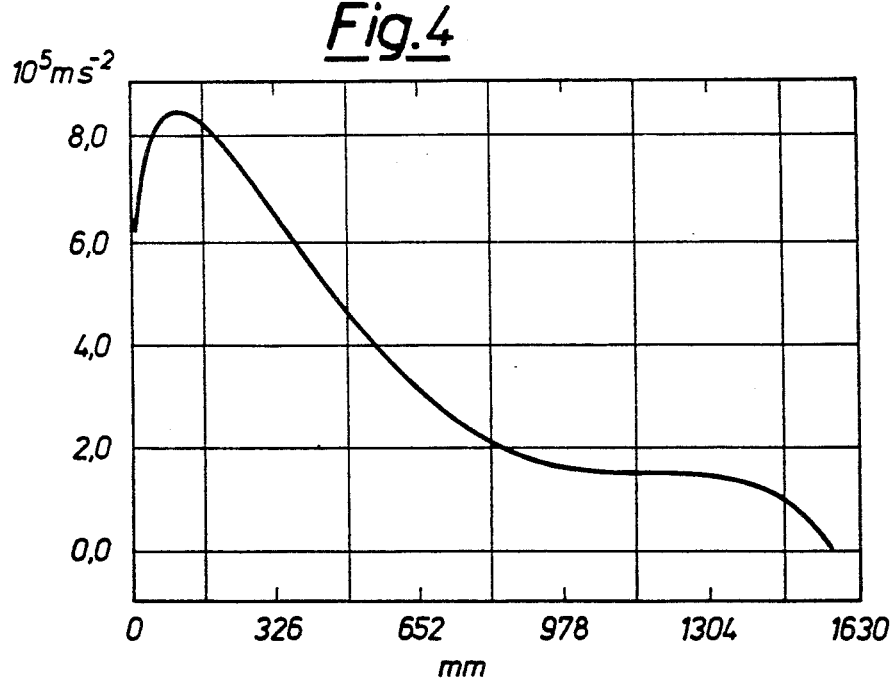
Fig. 4
Fig. 5

METHOD AND APPARATUS FOR CALCULATING MOTIONAL CHARACTERISTICS

BACKGROUND OF THE INVENTION

1. Field of the Invention

The present invention relates to a method and to an apparatus for calculating motional characteristics of an object moving relative to a measuring structure, particularly of a projectile moving in a weapon barrel.

2. Description of the Prior Art

In general terms, in such techniques, an electromagnetic wave is directed from a measuring structure onto the object to be measured and is superimposed with the wave reflected by the object, the chronological curve of the phase difference between the forward wave and the return wave represented by an electrical measured signal is assigned to individual amplitude values of the appertaining phase difference and, therefore, to the respective location of the object, and the respective motional characteristics are calculated by differentiation of this phase difference with respect to time. The corresponding apparatus comprises a generator for generating an electromagnetic wave, a coupling arrangement in communication therewith for infeed of the electromagnetic waves into the barrel of the web, a mixing stage for superimposing a portion of the infed wave with the wave reflected by the projectile, a transient recorder for recording the electrical measured signal that represents the chronological curve of the phase difference between the transmitted wave and the return wave, and an evaluation device for the measured signal.

Methods and apparatus of the type set forth above are excellently suited for non-contacting measurement of the curve of velocity and acceleration of intrinsically arbitrary, moving objects but have recently achieved significance mainly in conjunction with what is referred to as internal ballistics of firearms. In addition to the gas pressure, the translational projectile motion in the barrel of the weapon, i.e. path, velocity and acceleration of the projectile, that is produced by the pressure of the projectile on the bottom is of central significance in internal ballistics. Methods of the above type are presently implemented in the caliber range from about 5-600 mm with commercially-available microwave interferometers.

Therefore, for example, U.S. Pat. No. 2,691,761, U.S. Pat. No. 2,735,981, and U.S. Pat. No. 2,824,284, all of which are incorporated herein by this reference, respectively disclose a method or, respectively, an apparatus of the above type, whereby the distance between neighboring maximums or, respectively, minimums of the registered interferometer signal is respectively measured and utilized for further processing in all cases for evaluating the electrical measured signal that represents the chronological curve of the phase difference between the transmitted and return waves. Since, given the assumption that no disturbing influences occur due to combustion gases that could be pressed in front of the projectile due to leaks, the local frequency of the Doppler shift is directly proportional to the velocity of the projectile at the respective location. An allocation on the one hand of the appearance of these maximums or, respectively, minimums to discrete locations along the length of the barrel of the weapon can occur by way of the known propagation wave lengths of the electromagnetic wave employed and, on the other hand, a defined velocity can be respectively assigned to a location at these locations by forming the difference quotient of a quantity proportional to the measured, chronological intervals.

Only point-by-point results at discrete times are thereby directly obtained from the actual measurement, this meaning that there is actually no steady, differentiable signal curve. Mean velocities can, in fact, be respectively assumed between the individual extreme values, but these then change discontinuously at the extreme values themselves. In most case, a direct averaging over the discrete velocity values obtained in this manner leads to errors which cannot be compensated since, although the velocity is linearly dependent on the path, it is hyperbolically dependent on the time (velocity v = path s/time t—an averaging over the time therefore occurs in the denominator of the fraction). Further, great errors of course derive due to the measuring of the spacings of the extreme values themselves, since it cannot be guaranteed in discrete-time systems that the actual extreme values are also sensed and, therefore, each quantization error has a direct influence and causes additional error in the result supplied by the measurement that can practically not be corrected.

What is available as a second, somewhat more elegant method for calculating the local frequency and, therefore, discrete velocity or, respectively, acceleration values at a defined time or, respectively, at a defined location in the barrel of the weapon is short-time Fourier transformation which, in fact, already takes all registered amplitude values of the interferometer signal into consideration and therefore averages over the quantization and phase errors that are unavoidable in the measurement itself, but has further disadvantages that are founded on the nature of the method itself. Similar to the uncertainty relation, one thereby encounters the problem, expressed in general terms, that the product of the measuring time and frequency bandwidth is a constant value; when one therefore wishes to calculate the Doppler frequency and, therefore, the projectile velocity with great accuracy, the measuring time must be selected long, but this is impossible because of the highly-transient events.

SUMMARY OF THE INVENTION

It is therefore an object of the present invention to avoid the aforementioned disadvantages of the known methods or, respectively, of the known apparatus for the implementation of these methods and, in particular, to provide a method and an apparatus for calculating motional characteristics of an object moving relative to a measuring structure such that the location-dependent velocity or, respectively, acceleration of the object can be identified within narrow error limits with simple structure and method steps that are simple and fast to execute.

The above object is achieved, according to the present invention, in that, for calculating the steady curve of the location-dependent velocity and acceleration of the object, the appertaining, cumulative phase difference and, therefore, the respective location of the object is first allocated to each registered amplitude value in the measured signal, in that an analytic filtering function that can be steadily differentiated at least three times, preferably a Tschebyscheff function, is placed through the arc-cosine-transformed samples of the measured signal recorded point-by-point, and in that the location-dependent velocity or, respectively, acceleration of the object is calculated by a single or, respectively, double differentiation of the location with respect to time. The appertaining phase difference and, therefore, the respective location of the object is therefore allocated to each registered amplitude value of the interferometer signal via the known wavelength of the electromagnetic wave that is employed (in the measuring region, i.e., for instance, the barrel of the weapon). After arc-cosine transformation for phase-suited and, therefore, location-suited assignment of the different amplitude values (of course, an arc-sine transformation is also possible here insofar as the respective zero-axis crossings for the beginning and the end of a cycle are utilized instead of the extreme values), the compensating function is placed through the transformed amplitude values, this leading defacto to an averaging over potential quantization and phase errors without deteriorating the desired topical resolution and leading to a precise, analytical description of the time-dependent path. The time dependency of the location of the projectile that is therefore obtained can be simply and steadily differentiated and, after a single differentiation, yields the location-dependent velocity of the projectile and, after a further differentiation, yields the location-dependent acceleration of the projectile.

It is therefore possible with the method of the present invention to allocate a defined projectile velocity and acceleration to a defined location along the barrel of the weapon without this possibility of allocation being limited to individual extreme values or, on the other hand, without being affected by the fundamental uncertainty mentioned in conjunction with short-time Fourier analysis. In addition, the method of the invention makes it possible for the first time to calculate the velocity and the acceleration in the region before the appearance of the first minimum or, respectively, maximum in the interferometer signal, i.e. in a region that was not accessible to analysis at all with the aforementioned, known methods and apparatus.

An apparatus of the type generally set forth above is constructed, according to the present invention such that the evaluation device comprises an assignment unit that allocates the appertaining phase difference and, therefore, the respective projectile location to each time-dependently registered amplitude value in the measured signal, a compensation unit in communication with the assignment unit that, due to the arc-cosine transformed amplitude values of the measured signal registered point-by-point, places an analytic compensation filtering that can be steadily differentiated at least three times into the data, preferably a Tschebyscheff function, and comprises a differentiation unit in communication with the polynomial fitting unit for a single or, respectively, a double differentiation of the phase difference with respect to time. The specific execution of the disclosed, cooperating parts of the evaluation device, according to the present invention, is of no further significance here and can be left up to one of ordinary skill in the art. For example, the assignment unit and/or the filtering unit and/or the differentiation unit can thereby be realized, at least in part, by software, this also enabling a simple structure of the apparatus of the invention with respective, commercially-available elements that are well-known in the art.

For compensating amplitude fluctuations of the wave directed onto the optic, it is provided in accordance with a feature of the invention that the amplitude of the low-frequency oscillation between two extreme values in the registered measured signal is calculated by spline interpolation, preferably cubic spline interpolation. This feature is of significance particularly when the amplitude control of the generator that generates the electromagnetic wave employed does not have the required accuracy. A relative good amplitude control is assumed here because, of course, no distinction can theoretically be made based on the measuring principle between a reflection at a resting object with sine-like modulation of the incoming electromagnetic wave, on the one hand, and a correspondingly moving object with an electromagnetic wave having a constant amplitude. What is to be viewed here as the limit for an adequately-good amplitude control, which makes the interpolation superfluous, is the region in which a potential amplitude fluctuations cause smaller errors than those caused by the quantization effects of a transient recorder or the like; this allows amplitude errors in the per mil range.

In accordance with a further feature of the invention, in the method the initial phase relation is already calculated from a longer averaging of the measured signal before the shot since it is precisely the exact knowledge of the starting position of the projectile that has a great influence on the measuring error of the method. Since the phase difference and, therefore, the respective projectile location is analytically approximated by the filtering function, deviations in the evaluation arise between the actual phase superimposed with disturbances which, of course, are to be compensated and the phase defined by the filtering function. One should therefore strive to calculate the initial phase relation, as mentioned, before the shot by a longer averaging time of the mixer signal.

Lower error limits for the velocity calculation that lie at about 5% in the region of the acceleration maximum and below 1% in the region of the ultimate velocity can be achieved with the method of the present invention or, respectively, with the apparatus of the invention for carrying out the method.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 3 is a graphic illustration showing a velocity/path diagram as a result of the method of the present invention, proceeding from a signal curve of FIG. 2;

FIG. 4 is a graphic illustration of the corresponding acceleration/path diagram; and FIG. 5 is a graphic representation showing a somewhat clarified signal curve corresponding to FIG. 2.

DESCRIPTION OF THE PREFERRED EMBODIMENTS

Figure 1:
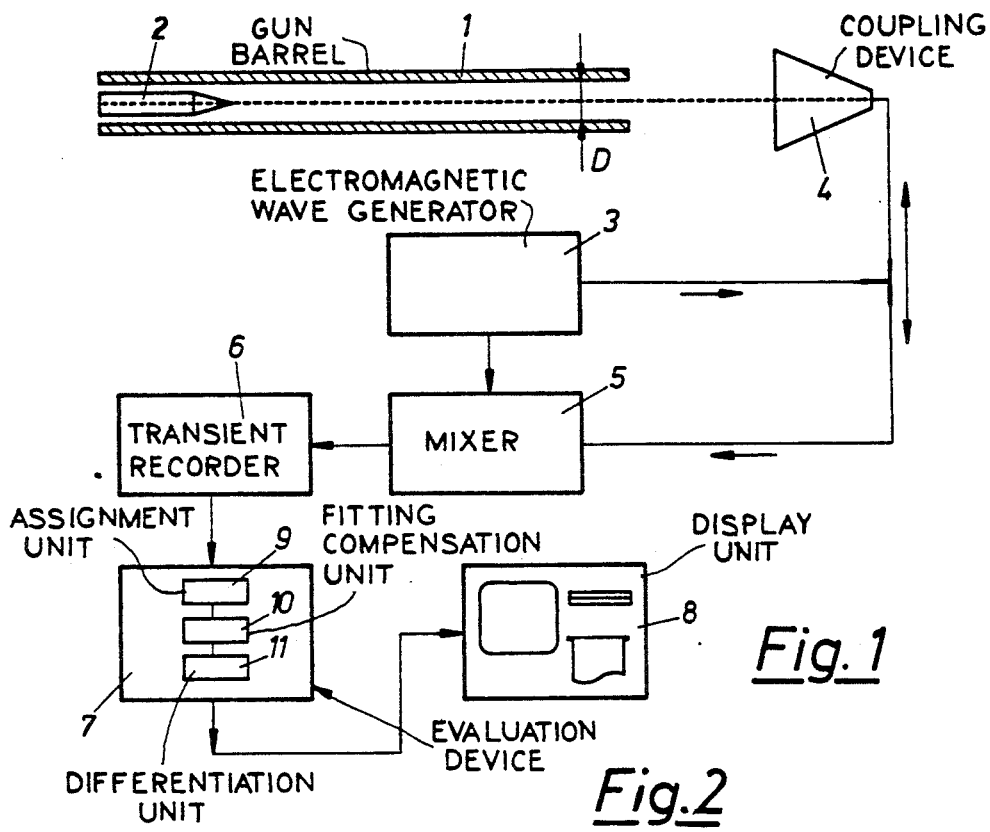
FIG. 1 is a schematic representation of an apparatus constructed in accordance with the present invention for calculation of the motional characteristics of a projectile moving in the barrel of a weapon.

Referring to FIG. 1, the apparatus illustrated serves the purpose of calculating motional characteristics of a projectile 2 moving in a barrel 1 of a weapon and comprises a generator 3 for generating an electromagnetic wave, a coupling arrangement 4 in communication with the generator 3 for infeed of the electromagnetic wave into the barrel 1 of the weapon, a mixer 5 for superimposing a portion of the infed wave with the wave reflected by the projectile 2, a transient recorder 6 for recording the electrical measured signal that represents the chronological curve of the phase difference between the transmitted wave and the return wave, and an evaluation device 7 for the measured signal. Further, a display unit 8 is provided for documentation or, respectively, display of the results. The evaluation device 7 comprises an assignment unit 9 that allocates the appertaining phase difference and, therefore, the respective location of the projectile to each time-dependently registered amplitude value in the measured signal, a filtering unit 10 in communication with the assignment unit 9 which places an analytic filtering function that can be steadily differentiated at least three times, for example, a Tschebyscheff function, through the arc-cosine-transformed amplitude values of the measured signal registered point-by-point, and a differentiation unit 11 in communication with the compensation unit 10 for the single or, respectively, double differentiation of the phase difference with respect to time.

Since the resolution of the path of the projectile 2 with the measuring method is proportional to the wavelength of the eletromagnetic wave employed (in the microwave range), the initial phase of the projectile motion that is important for the ignition events is resolved more accurately (approximately by a factor 50) than the following drive motion up to the muzzle of the barrel. For this reason, two different wave lengths are usually employed in such apparatus, for example 55 GHz having a wavelength of 5.5 mm in free space for the initial phase and a second frequency adapted to the barrel caliber D that always induces a wavelength of approximately two calibers in the barrel of the weapon; for a caliber of 120 mm, for example, this second frequency can amount to 1.9 GHz.

Instead of the infeed or, respectively, outfeed of the electromagnetic wave into or, respectively, out of the barrel 1 of the weapon shown in FIG. 1 via the coupling device 4, fashioned as a horn radiator, some other suitable coupling arrangement can, of course, be employed, for example a lateral infeed opening in the muzzle region of the barrel 1 of the weapon, wherewith the coupling device 4, differing from the illustration in FIG. 1, need not be replaced after each firing.

Figure 2:
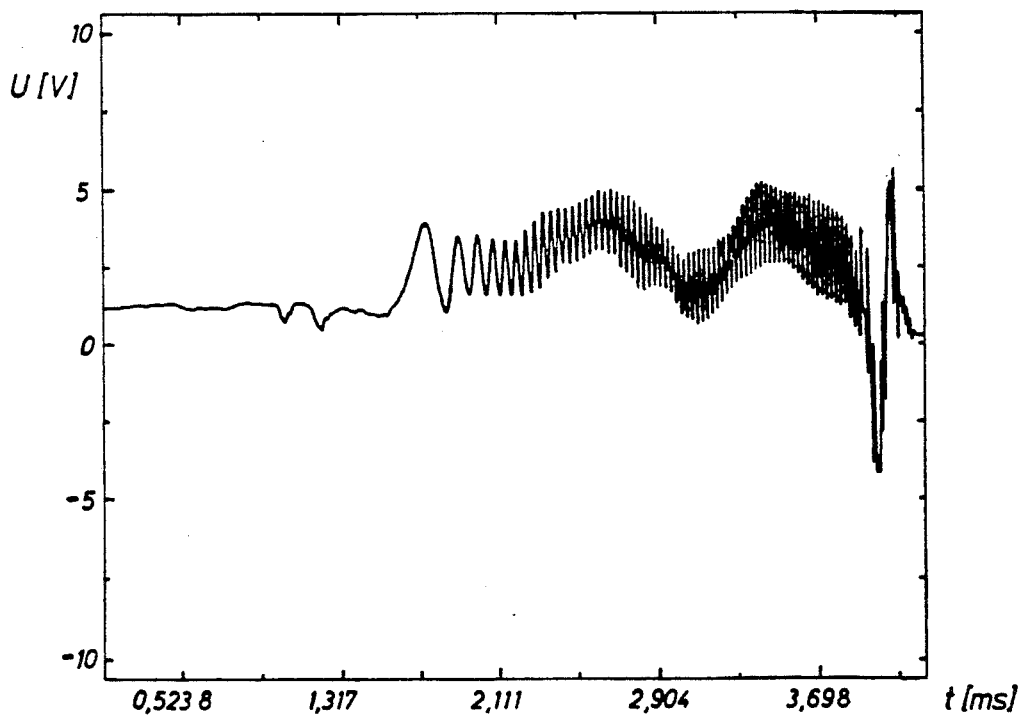
FIG. 2 is a graphic illustration of a typical example of an interferometer signal (voltage U over the time t) registered in a measurement with the apparatus shown in FIG. 1.

FIG. 2 then illustrates the signal curve U over the time t as it is registered, for example, in the transient recorder 6 of FIG. 1, the microwave frequency that is employed amounts to 10 GHz here, whereby a wavelength of 47.9 mm is formed in the interior of the barrel 1 of the weapon. In the recorded example, the overall length of the barrel amounted to 1585 mm, so that approximately 67 minimums and maximums are formed due to the motion of the projectile through the barrel of the weapon. The two downwardly-directed blips A, B that can be seen at the left preceding the first sinusoidal oscillation probably arise when the projectile is engraved into the rifling and lands of the barrel of the weapon.

The data actually registered in the transient recorder 6 having a length of 4096 seconds here, whereby each line contains the time information and the respective sample (for example, in ASCII). The registered electrical measured signal that represents the chronological curve of the phase difference between the forward wave and the return wave according to FIG. 2 is therefore actually composed of individual, discrete measuring points that are intrinsically affected by errors by the quantization or, respectively, with other errors as well. In the somewhat more simple or respectively, idealized curve of the measured signal of FIG. 5, these individual points may be particularly seen in the right-hand region of the illustration at the higher velocities.

An arc-cosine transformation in combination with the spline interpretation of the relevant parts of the signal according to FIG. 2 applied for the compensation of amplitude fluctuations essentially leads to a signal curve of the type illustrated in FIG. 5 whereby the amplitude is normalized to one. In that, for example with the assignment unit 9 in FIG. 1, the appertaining phase difference and, therefore, the location of the projectile is assigned to each of the measured points of FIG. 5, or, respectively, parallel thereto as well, an analytic filtering function that can be steadily differentiated at least three times, preferably a Tschebyscheff function, can be placed, for example, via the compensation unit 10 of FIG. 1, through the action points that have already been arcosine transformed, this enabling an analytic signal description or, respectively, portrayal of the time-dependent location of the projectile. The location-dependent projectile velocity is obtained according to FIG. 3 after one-time differentiation of the time-dependent projectile location with respect to time; the location-dependent projectile acceleration of FIG. 4 is obtained after a further differentiation with respect to time. It may be seen from both FIG. 3 and FIG. 4 that the calculated motional characteristics have a largely smooth and steady curve, this enabling accurate statements concerning the internal ballistics and also assuring small errors with respect thereto.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a method for measuring the motional characteristics of a projectile moving through a barrel of a weapon, the method being of the type in which a transmitted electromagnetic wave is directed through the barrel and onto the projectile resulting in a reflected wave which is superimposed on the transmitted wave, in which the appertaining phase difference and, thus, the location of the object with respect to individual amplitude values in the chronological curve of the phase difference between the transmitted wave and the reflected wave represented by an electrical measured and registered signal and the respective motional characteristics are calculated by the differentiation of the phase difference with respect to time, the improvement therein comprising the steps of:
   (a) assigning a respective phase difference and, thus, each respective location of the object represented by the measured signal to a respective registered amplitude value;
   (b) transforming specific points of the measured signal point-by-point in accordance with a predetermined geometric function;

(c) analytically compensating signal fluctuations of the transformed amplitude values of the measured signal with a filtering function that can be readily differentiated at least three times;

(d) differentiating the filtered signal with respect to time to obtain the location-dependent velocity; and (e) differentiating the location-dependent velocity with respect to time to obtain the acceleration of the projectile.

2. The improved method of claim 1, wherein the step (b) comprises:

(b1) arc-cosine transforming the measured signal point-by-point; and (b2) spline interpolating the amplitude of the low-frequency oscillations between two extreme values of the registered measured signal.

3. The improved method of claim 2, wherein the step (b1) of spline interpolating is further defined as:

(b1a) cubic spline interpolating.

4. The improved method of claim 1, for measuring with respect to a projectile fired through the barrel of a weapon, and further comprising the step of:

(f) prior to firing, calculating an initial phase relation between the transmitted wave and the reflected wave by long-term averaging of the measured signal.

5. Apparatus for calculating motional characteristics of a projectile moving the barrel of a weapon relative to a measuring structure, said apparatus comprising:

a coupling device facing the muzzle end of the barrel;

an electromagnetic wave generator connected to said coupling device for generating and coupling an electromagnetic wave as a transmitted wave into the barrel and onto the projectile which causes a reflected wave to be returned and received by the coupling device;

a mixer connected to said electromagnetic wave generator and to said coupling device for superimposing a part of the reflected wave onto the transmitted wave to form a measured signal that represents the chronological curve of the phase difference between the transmitted wave and the reflected wave;

a transient recorder connected to said mixer for registering the measured signal on a point-by-point basis; and an evaluation device connected to said transient recorder for evaluating the measured signal, said evaluation device comprising an assignment device for assigning the appertaining phase difference and, therefore, the respective projectile location to each time-dependently registered amplitude value of the measured signal, a filtering device connected to said assignment device for placing a filtering function that can be differentiated at least three times, through specific points of the measured signal registered point-by-point, and a differentiation device connected to said filtering device for differentiating the filtered signal a first time with respect to time to obtain the location-dependent velocity of the projectile and for differentiating the differentiated signal to obtain the acceleration of the projectile.

6. The apparatus of claim 5, wherein:

said filtering device provides a Tschebyscheff function.

* * * * *